(12) United States Patent
Koppey et al.

(10) Patent No.: US 11,579,349 B2
(45) Date of Patent: Feb. 14, 2023

(54) METHOD FOR PROTECTING AND CONCEALING SEAL IN ELECTRO-OPTIC WINDOW

(71) Applicant: GENTEX CORPORATION, Zeeland, MI (US)

(72) Inventors: Matthew A. Koppey, Holland, MI (US); Donald L. Bareman, Zeeland, MI (US); Stephen F. Richlich, Holland, MI (US); Michael J. VanAst, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 588 days.

(21) Appl. No.: 16/734,664

(22) Filed: Jan. 6, 2020

(65) Prior Publication Data
US 2020/0215982 A1 Jul. 9, 2020

Related U.S. Application Data

(60) Provisional application No. 62/788,987, filed on Jan. 7, 2019.

(51) Int. Cl.
*B60R 1/08* (2006.01)
*G02B 5/20* (2006.01)
*G02F 1/161* (2006.01)

(52) U.S. Cl.
CPC .............. *G02B 5/208* (2013.01); *B60R 1/08* (2013.01); *B60R 1/083* (2013.01); *G02F 1/161* (2013.01)

(58) Field of Classification Search
None
See application file for complete search history.

(56) References Cited

U.S. PATENT DOCUMENTS

| 5,066,112 A | 11/1991 | Lynam et al. |
| 5,986,797 A | 11/1999 | Lynam |
| 2010/0321758 A1 | 12/2010 | Bugno et al. |

OTHER PUBLICATIONS

International Search Report dated Mar. 12, 2020, for corresponding PCT application PCT/US2020/012313, 3 pages.
Written Opinion of the International Searching Authority dated Mar. 12, 2020 for corresponding PCT application No. PCT/US2020/012313, 5 pages.

*Primary Examiner* — Darryl J Collins
*Assistant Examiner* — Tamara Y. Washington
(74) *Attorney, Agent, or Firm* — Price Heneveld LLP; Brian James Brewer (57) ABSTRACT

An electro-optic window includes a first substrate; an electro-optic element generally parallel to the first substrate, the electro-optic element including: a second substrate; a third substrate generally parallel to the second substrate; a sealing member disposed along at least a portion of a perimeter of one of the second and third substrates and extending therebetween; and a cavity defined between the second and third substrates. The sealing member defines the sidewalls of the cavity. A first layer of film having a perimeter portion and a central portion is disposed between at least a portion of the first and second substrates, and may be coextensive with the sealing member.

19 Claims, 4 Drawing Sheets

METHOD FOR PROTECTING AND CONCEALING SEAL IN ELECTRO-OPTIC WINDOW

CROSS REFERENCE TO RELATED APPLICATIONS

This application claims the benefit of and priority to U.S. Provisional Patent Application No. 62/788,987, filed on Jan. 7, 2019, entitled Method for Protecting and Concealing Seal in Electro-Optic Window, the entire disclosure of which is hereby incorporated herein by reference.

FIELD OF THE DISCLOSURE

This disclosure relates generally to protective layers in electro-optic elements and in particular, to protective layers for epoxy seals in electro-optic elements.

BACKGROUND

Some skylights, windows, vehicle sunroofs, and other devices may include electro-optic (EO) elements within the device to provide variable light transmission through the device. The EO element may include a sealing member around a perimeter of the EO element. In some devices, the sealing member may comprise an adhesive, and in particular may comprise a formed bead of an adhesive such as an epoxy or an epoxy resin. Epoxies and epoxy resins may be subject to degradation from exposure to ultraviolet (UV) radiation. EO windows may be exposed to more UV radiation than typical EO devices such as mirrors that may be disposed in an interior of a vehicle. Although the laminating materials used in some safety glass in vehicle windows and sunroofs, typically either ethylene-vinyl acetate (EVA) or polyvinyl butyral (PVB), may offer partial protection from UV radiation, the protection may be incomplete. In addition, sometimes it may be desirable to conceal the sealing member for aesthetic reasons.

SUMMARY

According to an aspect of the disclosure, an electro-optic window may comprise a first substrate; an electro-optic element generally parallel to the first substrate, the electro-optic element comprising: a second substrate; a third substrate generally parallel to the second substrate; a sealing member disposed along at least a portion of a perimeter of one of the second and third substrates and extending therebetween; and a cavity defined between the second and third substrates. The sealing member may define the sidewalls of the cavity. A first layer of film having a perimeter portion and a central portion may be disposed between at least a portion of the first and second substrates. In some embodiments, the perimeter portion of the first layer of film may be a ultraviolet (UV) absorbing layer. In some embodiments, the perimeter portion of the first layer of film may be a UV-blocking layer. The perimeter portion of the first layer of film may block over 99 percent of light having wavelengths between 280 and 400 nm. In some embodiments, the perimeter portion of the first layer of film may be opaque or nearly opaque. The perimeter portion of the first layer of film may have a light transmittance for visible light of less than about one percent. The light transmission for UV light through the perimeter portion of the first layer of film may be less than one percent or less than 0.5%. The perimeter portion of the first layer of film may extend around a perimeter of the window; and the perimeter portion of the first layer of film may be at least coextensive with the seal. The perimeter portion of the first layer of film may be one of ethylene-vinyl acetate, polyvinyl butyral, ceramic ink, and chrome. In some embodiments, the electro-optic window may further comprise a fourth substrate extending generally parallel to the first substrate, and the fourth substrate may be disposed adjacent to the third substrate. A second layer of film having a perimeter portion and a central portion may extend between at least a portion of the third and fourth substrates. In some embodiments, the perimeter portion of the second layer of film may be a UV-blocking layer. The perimeter portion of the second layer of film may block over 99 percent of light having wavelengths between 280 and 400 nm. In some embodiments, the perimeter portion of the second layer of film may be a UV-absorbing layer. In some embodiments, the perimeter portion of the second layer of film may be opaque or nearly opaque. The perimeter portion of the second layer of film may have a light transmittance for visible light of less than about one percent. The light transmission for UV light through the perimeter portion of the second layer of film may be less than one percent or less than 0.5%.

According to another aspect, an electro-optic window may comprise a first substrate; an electro-optic element generally parallel to the first substrate, the electro-optic element comprising: a second substrate; a third substrate generally parallel to the second substrate; a sealing member disposed along at least a portion of a perimeter of one of the second and third substrates and extending therebetween; and a cavity defined between the second and third substrates. The sealing member may define the sidewalls of the cavity. A first layer of film may be disposed between at least a portion of the first and second substrates. The perimeter portion of the first layer of film may extend around a perimeter of the window; and the perimeter portion of the first layer of film may be at least coextensive with the seal. A fourth substrate may be disposed generally parallel to the first substrate and adjacent to the third substrate. A second layer of film having a perimeter portion and a central portion may be disposed between at last a portion of the third and the fourth substrates. The perimeter portion of the second layer of film may extend around a perimeter of the window; and the perimeter portion of the second layer of film may be coextensive with at least a portion of the seal.

In some embodiments, the perimeter portion of the first layer of film may be a UV-absorbing layer. In some embodiments, the perimeter portion of the first layer of film may be a UV-blocking layer. The perimeter portion of the first layer of film may block over 99 percent of light having wavelengths between 280 and 400 nm. In some embodiments, the perimeter portion of the first layer of film may be opaque or nearly opaque. The perimeter portion of the first layer of film may have a light transmittance for visible light of less than about one percent. The light transmission for UV light through the perimeter portion of the first layer of film may be less than one percent or less than 0.5%. The perimeter portion of the first layer of film may extend around a perimeter of the window; and the perimeter portion of the first layer of film may be at least coextensive with the seal. The perimeter portion of the first layer of film may be one of ethylene-vinyl acetate, polyvinyl butyral, ceramic ink, and chrome. The central portion of the first layer of film may also comprise at least one of ethylene-vinyl acetate, polyvinyl butyral, ceramic ink, and chrome.

In some embodiments, the perimeter portion of the second layer of film may be a UV-absorbing layer. In some embodiments, the perimeter portion of the second layer of film may be a UV-blocking layer. The perimeter portion of the second layer of film may block over 99 percent of light having wavelengths between 280 and 400 nm. In some embodiments, the perimeter portion of the second layer of film may be opaque or nearly opaque. The perimeter portion of the second layer of film may have a light transmittance for visible light of less than about one percent. The light transmission for UV light through the perimeter portion of the second layer of film may be less than one percent or less than 0.5%. The perimeter portion of the second layer of film may extend around a perimeter of the window; and the perimeter portion of the second layer of film may be at least coextensive with the seal. The perimeter portion of the second layer of film may be one of ethylene-vinyl acetate, polyvinyl butyral, ceramic ink, and chrome. The central portion of the second layer of film may also comprise at least one of ethylene-vinyl acetate, polyvinyl butyral, ceramic ink, and chrome.

According to another aspect, a vehicle may comprise an electro-optic window, the electro-optic window comprising: a first substrate; an electro-optic element generally parallel to the first substrate, the electro-optic element comprising: a second substrate; a third substrate generally parallel to the second substrate; a sealing member disposed along at least a portion of a perimeter of one of the second and third substrates and extending therebetween; and a cavity defined between the second and third substrates. The sealing member may define the sidewalls of the cavity. A first layer of film having a perimeter portion and a central portion may be disposed between at least a portion of the first and second substrates. In some embodiments, the perimeter portion of the first layer of film may be a UV-absorbing layer. In some embodiments, the perimeter portion of the first layer of film may be a UV-blocking layer. The perimeter portion of the first layer of film may block over 99 percent of light having wavelengths between 280 and 400 nm. In some embodiments, the perimeter portion of the first layer of film may be opaque or nearly opaque. The perimeter portion of the first layer of film may have a light transmittance for visible light of less than about one percent. The light transmission for UV light through the perimeter portion of the first layer of film may be less than one percent or less than 0.5%. In some embodiments, the perimeter portion of the first layer of film may extend around at least a portion of a perimeter of the window, and the perimeter portion of the first layer of film may be coextensive with at least a portion of the seal.

In some embodiments, the perimeter portion of the first layer of film may be one of ethylene-vinyl acetate, polyvinyl butyral, ceramic ink, and chrome. In some embodiments, the electro-optic window further comprises a fourth substrate generally parallel to the first substrate, and the fourth substrate may be disposed adjacent to the third substrate. In some embodiments, a second layer of film having a perimeter portion and a central portion may be disposed between at least a portion of the third and fourth substrates. In some embodiments, the perimeter portion of the second layer of film may be a UV-blocking layer. The perimeter portion of the second layer of film may block over 99 percent of light having wavelengths between 280 and 400 nm. In some embodiments, the perimeter portion of the second layer of film may be a UV-absorbing layer. In some embodiments, the perimeter portion of the second layer of film may be opaque or nearly opaque. The perimeter portion of the second layer of film may have a light transmittance for visible light of less than about one percent. The light transmission for UV light through the perimeter portion of the second layer of film may be less than one percent or less than 0.5%. In some embodiments, the electro-optic window is a sunroof of a vehicle.

According to another aspect, a vehicle may comprise an electro-optic window, the electro-optic window comprising: a first substrate; an electro-optic element generally parallel to the first substrate, the electro-optic element comprising: a second substrate; a third substrate generally parallel to the second substrate; a sealing member disposed along at least a portion of a perimeter of one of the second and third substrates and extending therebetween; a cavity defined between the second and third substrates, and a fourth substrate disposed generally parallel to and adjacent to the third substrate. The sealing member may define the sidewalls of the cavity. A first layer of film having a perimeter portion and a central portion may be disposed between at least a portion of the first and second substrates. In some embodiments, the perimeter portion of the first layer of film may be a UV-absorbing layer. In some embodiments, the perimeter portion of the first layer of film may be a UV-blocking layer. The perimeter portion of the first layer of film may block over 99 percent of light having wavelengths between 280 and 400 nm. In some embodiments, the perimeter portion of the first layer of film may be opaque or nearly opaque. The perimeter portion of the first layer of film may have a light transmittance for visible light of less than about one percent. The light transmission for UV light through the perimeter portion of the first layer of film may be less than one percent or less than 0.5%. In some embodiments, the perimeter portion of the first layer of film may extend around at least a portion of a perimeter of the window, and the perimeter portion of the first layer of film may be coextensive with at least a portion of the seal. A second layer of film having a perimeter portion and a central portion may be disposed between at least a portion of the third and fourth substrates. In some embodiments, the perimeter portion of the second layer of film may be a UV-absorbing layer. In some embodiments, the perimeter portion of the second layer of film may be a UV-blocking layer. The perimeter portion of the second layer of film may block over 99 percent of light having wavelengths between 280 and 400 nm. In some embodiments, the perimeter portion of the second layer of film may be opaque or nearly opaque. The perimeter portion of the second layer of film may have a light transmittance for visible light of less than about one percent. The light transmission for UV light through the perimeter portion of the first layer of film may be less than one percent or less than 0.5%. In some embodiments, the perimeter portion of the second layer of film may extend around at least a portion of a perimeter of the window, and the perimeter portion of the second layer of film may be coextensive with at least a portion of the seal. In some embodiments, the perimeter portion of the second layer of film may be one of ethylene-vinyl acetate, polyvinyl butyral, ceramic ink, and chrome. The electro-optic window may be a sunroof of a vehicle.

DETAILED DESCRIPTION

As used herein, the term "windows" refers to windows in buildings, windows in vehicles, sunroofs in vehicles, and skylights. As used herein, the term "EO windows" refers to windows having an electro-optic (EO) element. EO elements may be disposed in some sunroofs, skylights, or other windows including vehicle windows. The EO element in an EO window may allow the window to selectively darken, thereby reducing the amount of sunlight passing through the window.

The present disclosure relates both to obscuring sealing members of EO elements from view and to protecting sealing members of EO elements from ultra-violet (UV) radiation by providing at least one layer of film in the EO window. The at least one layer of film may additionally provide resistance to breakage for EO window.

Figure 1:
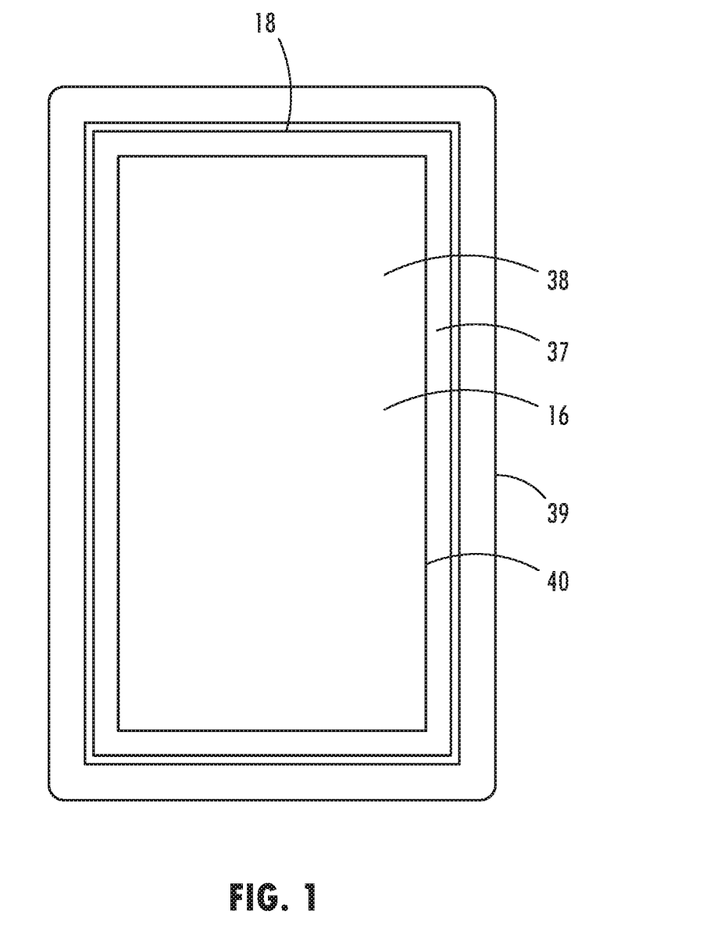
FIG. 1 is a schematic representation of a top view of a protective layer in accordance with the present disclosure.

FIG. 1 illustrates a top view of an EO window, generally indicated at 10. EO window 10 may comprise a first substrate 20 having a first surface 20A and a second surface 20B, and an EO element 26. EO element 26 may be disposed generally parallel to and coextensive with first substrate 20.

First substrate 20 may be of glass, transparent polyethylene terephthalate, or any other suitable material. First substrate 20 may be generally transparent. First surface 20A of first substrate 20 may be configured to be an exterior surface of EO window 10. Second surface 20B of first substrate 20 may be disposed adjacent to EO element 26.

A first layer of film 16 may be disposed between first substrate 20 and EO element 26. First layer of film 16 may comprise a central portion 38 and a perimeter portion 37 extending along at least a portion of the perimeter of first layer of film. Perimeter portion 37 may extend around an exterior edge of central portion 38 and may surround central portion 38 of first layer of film 16. In some embodiments, perimeter portion 37 may extend around the entire perimeter of EO window 10, and central portion 38 may be bounded by perimeter portion 37. An exterior edge 39 may extend along the outer edge of perimeter portion 37 of first layer of film 16. An interior edge 40 may extend along the length of the interface between central portion 38 and perimeter portion 37 of first layer of film 16 on an inner edge of perimeter portion 37.

Figure 2:
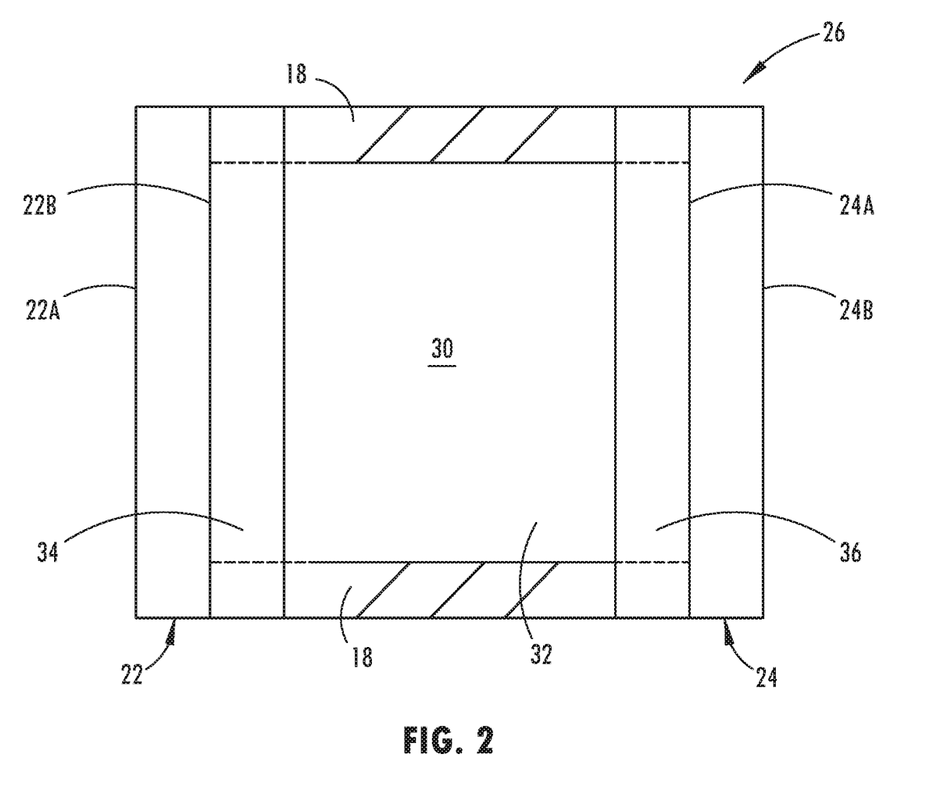
FIG. 2 is a cross-sectional schematic representation of an electro-optic element in accordance with the present disclosure.

FIG. 2 shows a schematic representation of electro-optic (EO) element 26. EO element 26 may comprise a second substrate 22, a third substrate 24 disposed generally parallel to second substrate 22, and a sealing member 18. Second substrate 22 may have a first surface 22A opposed to first substrate 20, and a second surface 22B. Third substrate 24 may have a first surface 24A opposed to second surface 22B of second substrate 22, and a second surface 24B. Sealing member 18 may extend between second surface 22B of second substrate and first surface 24A of third substrate 24 along at least a portion of a perimeter of EO element 26 holding second substrate 22 and third substrate 24 in a spaced-apart relationship. A chamber 30 for containing an electro-optic medium 32 may be defined by second surface 22B of second substrate 22, the opposed first surface 24A of third substrate 24, and the inner walls of sealing member 18.

One or more layers of electrically conductive material or electrode coatings 34 may be associated with second surface 22B of second substrate 22. These layers may serve as a first electrode for electro-optic element 26. Similarly, one or more layers of electrically conductive material or electrode coatings 36 may be associated with and disposed on first surface 24A of third substrate 24 and may operate as a second electrode for electro-optic element 26. Electrode coating 34 may be a material that: (a) is substantially transparent in the visible region of the electromagnetic spectrum; (b) bonds reasonably well to second substrate; (c) maintains this bond when associated with a sealing member; (d) is generally resistant to corrosion from materials contained within electro-optic element 26 or the atmosphere; and (e) exhibits minimal diffusion or specular reflectance as well as sufficient electrical conductance. Electrode coating may be fabricated from, for example, fluorine doped tin oxide (FTO), indium/tin oxide (ITO), doped zinc oxide or other materials known to those having ordinary skill in the art.

In some embodiments, sealing member 18 of EO element 26 may be of an opaque material. Sealing member 18 may comprise an adhesive and may comprise a formed bead of an adhesive. Sealing member 18 may comprise an epoxy or an epoxy resin. Some epoxies and epoxy resins may be subject to degradation from exposure to ultra-violet (UV) radiation. Therefore, it may be advantageous to protect sealing member 18 from exposure to UV radiation. Furthermore, it may be aesthetically desirable to shield sealing member 18 from view.

Figure 3:
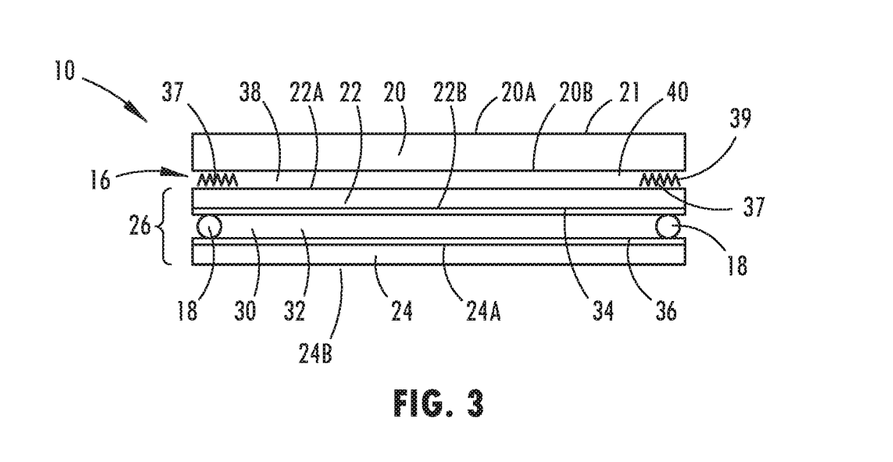
FIG. 3 is a schematic representation of a side view of a first embodiment of an electro-optic window having a layer of film in accordance with the present disclosure.

FIG. 3 shows an embodiment of EO window 10 in which perimeter portion 37 of first layer of film 16 is configured to protect sealing member 18 from UV radiation by reducing or preventing the passage of UV radiation through perimeter portion 37 of first layer of film 16 to sealing member. Perimeter portion 37 of first layer of film 16 may be configured to be at least coextensive with sealing member 18. In some embodiments, perimeter portion 37 of first layer of film 16 may extend beyond sealing member 18 toward center of EO window 10.

In some embodiments, first layer of film 16 may extend between at least a portion of first and second substrates 20, 22, of EO window 10. Perimeter portion 37 of first layer of film 16 may extend to be at least coextensive with at least a portion of sealing member. Perimeter portion 37 may thereby at least partially cover sealing member 18 and at least partially prevent UV radiation from contacting sealing member 18. In some embodiments, perimeter portion 37 of first layer of film 16 may extend around at least a portion of the perimeter of EO window 10. In some embodiments, perimeter portion 37 of first layer of film 16 may be configured to conceal entire sealing member 18, thereby protecting entire sealing member 18 from exposure to UV radiation.

Perimeter portion 37 of first layer of film 16 may surround and be coplanar with central portion 38 of first layer of film 16. Central portion 38 of first layer of film 16 may comprise a UV-absorbing material, and thereby may provide at least partial protection from UV radiation to interior of vehicle.

In some embodiments, perimeter portion 37 of first layer of film 16 may comprise a material that absorbs UV radiation. In some embodiments, perimeter portion 37 of first layer of film 16 may comprise a material that blocks UV radiation. Perimeter portion 37 of first layer of film 16 may be configured to block over 99 percent of light having wavelengths between 280 and 400 nm. In some embodiments, perimeter portion 37 of first layer of film 16 may comprise a material that both absorbs and blocks UV radiation.

Perimeter portion 37 of first layer of film 16 may comprise different colors and characteristics. For example, in some embodiments, perimeter portion 37 of first layer of film 16 may be opaque or nearly opaque. Perimeter portion 37 of first layer of film 16 may be configured to have a light transmission in the visible region of about one percent or less. In some embodiments, light transmission for UV light through perimeter portion 37 of first layer of film 16 may be less than one percent or less than 0.5%. Perimeter portion 37 of first layer of film 16 may be dark or black in color, or perimeter portion 37 of first layer of film 16 may be colored. For example, EO window 10 may be disposed in a vehicle and perimeter portion 37 may be colored to coordinate or contrast with the color of the vehicle in which the window is disposed. Perimeter portion 37 of first layer of film 16 may comprise more than one color. In some embodiments, the color in perimeter portion 37 of first layer of film 16 may be impregnated within first layer of film 16. In some embodiments, the color in perimeter portion 37 of first layer of film 16 may be painted or printed on first layer of film 16. The color in perimeter portion 37 of first layer of film 16 may be capable of blocking the passage of light through perimeter portion 37 of first layer of film 16.

In some embodiments, perimeter portion 37 of first layer of film 16 may be configured to be reflective, and may be configured to reflect incoming UV radiation, thereby preventing the UV radiation from reaching sealing member 18. For example, perimeter portion 37 of first layer of film 16 may comprise a layer of a metallic material such as chrome. In some embodiments, a ceramic ink may be disposed around perimeter portion 37 of first layer of film 16, and may be capable of blocking UV radiation from sealing member 18.

In some embodiments, central portion 38 of first layer of film 16 may comprise a transparent material. Central portion 38 may comprise one of ethylene-vinyl acetate (EVA) and polyvinyl butyral (PVB), and may comprise one of transparent EVA or transparent PVB. In some embodiments, central portion 38 of first layer of film 16 may comprise thermoplastic polyurethane.

In some embodiments, perimeter portion 37 of first layer of film 16 may comprise one of EVA or PVB, and may comprise opaque or nearly opaque EVA or PVB. EVA and PVB may absorb at least a portion of incoming UV radiation. A layer of opaque or nearly opaque EVA or PVB may both at least partially absorb and at least partially block UV radiation, thereby reducing or eliminating the passage of UV radiation through the opaque or nearly opaque EVA or PVB. Reducing or preventing the passage of UV radiation through perimeter portion 37 of first layer of film 16 may prevent UV-related damage to sealing member 18 of EO element 26. Damaged sealing members 18 in an EO element 26 may cause the degradation of EO medium 32, thereby causing premature failure of EO element 26. At least one of central portion 38 of first layer of film 16 and perimeter portion 37, being disposed between first and second substrates 20, 22, may additionally function to prevent EO window 10 from shattering if it is broken.

In addition, an opaque or nearly opaque EVA or PVB perimeter portion 37 of first layer of film 16 may prevent viewers on the exterior of a vehicle from seeing sealing member, thereby giving EO window a more aesthetically pleasing appearance.

In some embodiments, perimeter portion 37 and central portion 38 of first layer of film 16 may each comprise a different material. For example, perimeter portion 37 may comprise EVA and central portion 38 may comprise PVB. In another example, perimeter portion 37 may comprise PVB and central portion 38 may comprise EVA.

In some embodiments, perimeter portion 37 and central portion 38 of first layer of film 16 may comprise the same type of material, such as EVA or PVB, but may have different transmissivity properties. For example, both perimeter portion 37 and central portion 38 may comprise EVA, but the EVA of the perimeter portion 37 may have different transmissivity than the EVA of central portion 38.

Perimeter portion 37 of first layer of film 16 may comprise a plurality of strips. Each strip may be configured to extend around a portion of central portion 38 of first layer of film 16. Ends of at least some strips may abut sides or ends of other strips to allow the strips to extend completely around central portion. In some embodiments, ends of at least some of the strips of perimeter portion 37 may be configured to interlock with ends of other strips to allow for ease of manufacturing.

First layer of film 16 may be laminated between first substrate 20 and EO element 26, thus also positioning perimeter portion 37 between first substrate 20 and EO element 26. First layer of film 16 may be applied to one of second surface 20B of first substrate or first surface 22A of second substrate. Since perimeter portion 37 may be UV-protective, laminating first layer of film 16 between first substrate 20 and EO element 26 may provide UV protection to sealing member 18. In addition, laminating first layer of film 16 between first substrate 20 and EO element 26 may eliminate the need for the manufacturing steps involved in separately adding a UV-blocking material to exterior surface 20A of first substrate 20. Being positioned between first substrate 20 and EO element 26, first layer of film 16 may provide protection against EO window 10 shattering into sharp pieces upon an impact while also providing protection to sealing member 18 from UV radiation and obscuring sealing member 18 from view. Furthermore, disposing first layer of film 16 between first substrate 20 and EO element 26 rather than on exterior surface 20A of EO window 10 exposed to the elements may prevent the degradation of or damage to first layer of film 16 from exposure to the elements.

Figure 4:
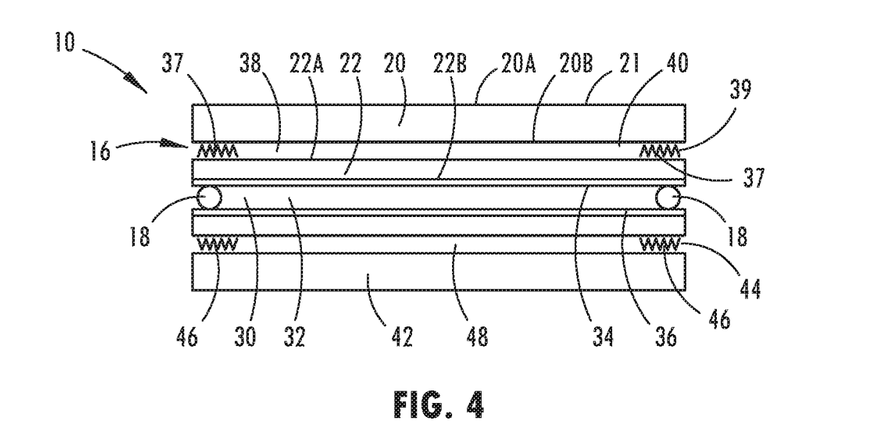
FIG. 4 is a schematic representation of a side view of a second embodiment of an electro-optic window having layers of film in accordance with the present disclosure.

In some embodiments, an optional fourth substrate 42 may be designed to be the interior surface of EO window 10, and may be disposed parallel to third substrate 24, as shown in FIG. 4. Fourth substrate 42 may comprise glass, polyethylene terephthalate, or other suitable material, and may be generally transparent.

A second layer of film 44 may extend between at least a portion of third and fourth substrates 24, 42 of EO window 10. Second layer of film 44 may comprise both a perimeter portion 46 that extends around at least a portion of the perimeter of EO window 10 and a central portion 48 that overlays the center portion of EO window 10. Perimeter portion 46 of second layer of film 44 may be coextensive with at least a portion of sealing member 18. Perimeter portion 46 of second layer of film 44 may be configured to cover and conceal at least a portion of sealing member 18. In some embodiments, perimeter portion 46 may be configured to cover and conceal entire sealing member. In some embodiments, perimeter portion 46 of second layer of film 44 may extend beyond sealing member 18 toward the interior of EO window 10. In some embodiments, perimeter portion 46 of second layer of film 44 may be coextensive with perimeter portion 37 of first layer of film 16.

In some embodiments, perimeter portion 46 of second layer of film 44 may comprise a material that absorbs UV radiation. In some embodiments, perimeter portion 46 of second layer of film 44 may comprise a material that blocks UV radiation. Perimeter portion 46 of second layer of film 44 may be configured to block over 99 percent of light having wavelengths between 280 and 400 nm. In some embodiments, perimeter portion 46 of second layer of film 44 may comprise a material that both absorbs and blocks UV radiation.

Perimeter portion 46 of second layer of film 44 may be opaque or nearly opaque. Perimeter portion 46 of second layer of film 44 may be configured to allow light transmission in the visible region of the electromagnetic spectrum of about one percent or less. Light transmission for UV light through perimeter portion 37 of first layer of film 16 may be less than one percent or less than 0.5%. Perimeter portion 46 of second layer of film 44 may comprise one of opaque or nearly opaque EVA and opaque or nearly opaque PVC. In some embodiments, perimeter portion 46 of second layer of film 44 may be colored or may be black in color. The color of perimeter portion 46 may be chosen to coordinate with the color of the vehicle in which EO window 10 is disposed. The color may be impregnated within perimeter portion 46 of second layer of film 44. Additionally or alternatively, the color may be printed on a surface of second layer of film 44.

In some embodiments, perimeter portion 46 of second layer of film 44 may be reflective. Perimeter portion 46 may be configured to reflect incoming solar UV radiation, thereby protecting sealing member 18 from the UV radiation. Perimeter portion 46 of second layer of film 44 may comprise a layer of a metallic material such as chrome.

In some embodiments, a ceramic ink may be disposed around perimeter portion 46 of second layer of film 44, and may be capable of blocking UV radiation from sealing member 18.

Central portion 48 of second layer of film 44 may comprise a transparent material. In some embodiments, perimeter portion 46 of second layer of film 44 may extend completely around the perimeter of EO window 10 and central portion 48 of second layer of film may extend to fill in the area bounded by perimeter portion 46. Central portion 48 of second layer of film 44 may comprise one of EVA and PVB.

In some embodiments, central portion 48 of second layer of film 44 may comprise one of EVA and PVB, and perimeter portion 46 of second layer of film 44 may comprise the other. For example, central portion 48 may comprise EVA, and perimeter portion 46 may comprise PVB or vice versa. In some embodiments, central portion 48 of second layer of film 44 and perimeter portion 46 of second layer of film 44 may both comprise the same material. For example, central portion 48 and perimeter portion 46 of second layer of film 44 may both comprise EVA or may both comprise PVB.

In some embodiments, perimeter portion 46 may comprise several strips, each strip configured to extend along at least a portion of a side of central portion 48. For example, central portion 48 may be generally rectangular or square. Perimeter portion 46 may comprise four strips, each strip configured to extend along a side of central portion 48. At least some of the strips may extend beyond central portion 48, and the portion of the strip that extends beyond central portion 48 may abut against a side or an end of another strip. The strips of perimeter portion 46 may collectively extend along the perimeter of central portion 48. In some embodiments, the ends of the strips may interlock with one another for ease of manufacturing.

Figure 5:
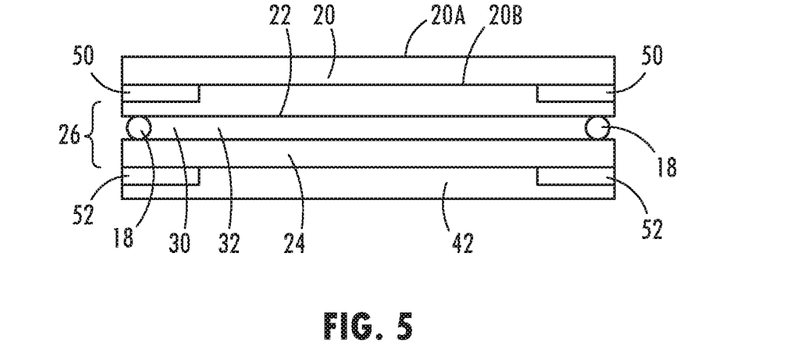
FIG. 5 is a side view of a third embodiment of an electro-optic window having at least one layer of film in accordance with the present disclosure.

In an alternative embodiment, shown in FIG. 5, EO window 10 may comprise a first substrate 20 and an EO element 26 comprising a second substrate 22 and a third substrate 24. Sealing member 18 may extend between second substrate 22 and third substrate 24 along a perimeter of EO element 26. Sealing member 18 may hold second substrate 22 and third substrate 24 in a spaced-apart relationship, and may, in combination with second substrate and third substrate 24, define a chamber in which EO medium 32 may be disposed. A UV-protective layer of film 50 may extend along a perimeter portion of EO window. UV-protective layer of film 50 may be at least coextensive with sealing member 18. UV-protective layer of film 50 may not extend across the central portion of EO element 26. UV-protective layer of film 50 may comprise one of EVA and PVB. In some embodiments, UV-protective layer of film 50 may be opaque or nearly opaque and may be capable of blocking UV radiation from passing through UV-protective layer of film 50. For example, UV-protective layer may comprise glass frit. UV-protective layer of film 50 may be configured to block over 99 percent of incoming light having wavelengths between 280 and 400 nm. In some embodiments, UV-protective layer of film 50 may comprise a UV-absorbing material, thereby reducing or preventing UV radiation from reaching sealing member 18. In some embodiments, UV-protective layer of film 50 may comprise an opaque or nearly opaque UV-absorbing material that both blocks and absorbs entering UV radiation, thereby reducing or preventing UV damage to sealing member 18. UV-protective layer of film 50 may be configured to allow about one percent or less light transmission of visible light. Light transmission for UV light through UV-protective layer of film 50 may be less than one percent or less than 0.5%.

EO window 10 may further comprise a fourth substrate 42. A second layer of film 52 may extend between a perimeter portion of third substrate 24 and fourth substrate 42. Second layer of film 52 may extend around at least a portion of the perimeter of EO window 10 and may be coextensive with at least a portion of sealing member 18. Second layer of film 52 may be opaque or nearly opaque and may prevent the passage of light and UV radiation through second layer of film. This may obscure sealing member 18 from view. Second layer of film 52 may be configured to allow light transmission of visible light of about one percent or less. Light transmission for UV light through perimeter portion 37 of second layer of film 16 may be less than one percent or less than 0.5%.

Figure 6:
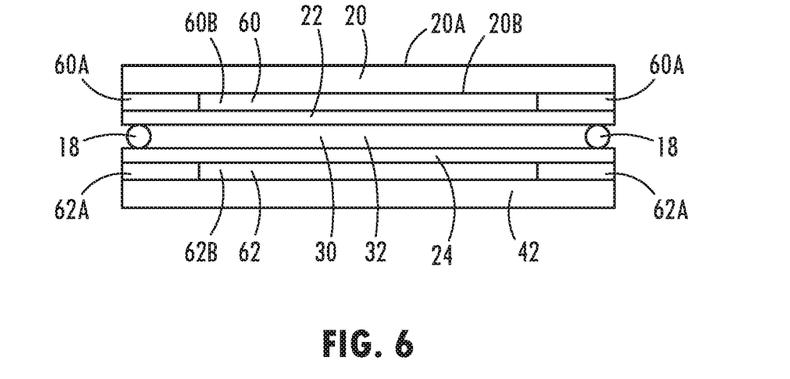
FIG. 6 is a side view of a fourth embodiment of an electro-optic window having at least one layer of film in accordance with the present disclosure.

In another alternative embodiment, shown in FIG. 6, EO window 10 may comprise a first substrate 20 and an EO element 26 comprising a second substrate 22 and a third substrate 24. Sealing member 18 may extend between second substrate 22 and third substrate 24 along a perimeter of EO element 26. Sealing member 18 may hold second substrate 22 and third substrate 24 in a spaced-apart relationship, and may, in combination with second substrate and third substrate 24, define a chamber in which EO medium 32 may be disposed. A first layer of film 60 may extend between first substrate 20 and second substrate 22. First layer of film 60 may comprise two separate portions: a perimeter portion 60A and a central portion 60B. Perimeter portion 60A may be disposed around the exterior of central portion 60B. Perimeter portion 60A may at least partially overlap central portion 60B. Perimeter portion 60A may be coextensive with sealing member 18.

EO window 10 may further comprise a fourth substrate 42 adjacent to and generally parallel to third substrate 22. A second layer of film 62 may extend between third substrate 22 and fourth substrate 42. Second layer of film 62 may comprise two separate portions: a second perimeter portion 62A and a second central portion 62B. Second perimeter portion 62A may be disposed around the exterior of second central portion 62B. Second perimeter portion 62A may at least partially overlap second central portion 62B. Second perimeter portion 62A may be coextensive with sealing member 18.

Both perimeter portion 60A and central portion 60B may comprise one of EVA and PVB. Both perimeter portion 60A and central portion 60B may be opaque or nearly opaque and may therefore be capable of blocking UV radiation from passing through. Perimeter portion 60A and central portion 60B may be configured to allow about one percent or less visible light transmission, and may be configured to block at least about 99 percent of light having wavelengths between 280 and 400 nm. Light transmission for UV light through perimeter portion 60A and central portion 60B may be less than one percent or less than 0.5%. Perimeter portion 60A may comprise a UV-absorbing material to absorb incoming UV radiation.

Both second perimeter portion 62A and second central portion 62B may comprise one of EVA and PVB. Both second perimeter portion 62A and second central portion 62B may be opaque or nearly opaque and may therefore be capable of blocking UV radiation from passing through. Both second perimeter portion 62A and second central portion 62B may be configured to allow about one percent or less visible light transmission, and may be configured to block at least about 99 percent of light having wavelengths between 280 and 400 nm. Light transmission for UV light through second perimeter portion 62A and second central portion 62B may be less than one percent or less than 0.5%.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It should be noted that references to "front," "back," "rear," "upward," "downward," "inner," "outer," "right," and "left" in this description are merely used to identify the various elements as they are oriented in the FIGURES. These terms are not meant to limit the element which they describe, as the various elements may be oriented differently in various applications.

The invention claimed is:

1. An electro-optic window comprising:
   a first substrate;
   an electro-optic element generally parallel to the first substrate, comprising:
      a second substrate;
      a third substrate generally parallel to the second substrate;
      a sealing member disposed along at least a portion of a perimeter of one of the second and third substrates and extending therebetween; and
      a cavity defined between the second and third substrates, with the sealing member defining sidewalls of the cavity;
   a fourth substrate generally parallel to the first substrate, wherein the fourth substrate is disposed adjacent to the third substrate; and
   a first layer of film between at least a portion of the first and second substrates.

2. The electro-optic window of claim 1, wherein the first layer of film comprises a perimeter portion and a central portion;
   wherein the perimeter portion extends around at least a portion of a perimeter of the electro-optic window; and
   wherein the perimeter portion is coextensive with at least a portion of the sealing member.

3. The electro-optic window of claim 1, wherein the perimeter portion of the first layer of film is a UV-absorbing layer.

4. The electro-optic window of claim 1, wherein the perimeter portion of the first layer of film is a UV-blocking layer; and
   wherein the perimeter portion of the first layer of film is capable of blocking at least 99 percent of light having wavelengths between 280 and 400 nm.

5. The electro-optic window of claim 1, wherein the perimeter portion of the first layer of film is one of opaque and nearly opaque; and
   wherein the perimeter portion of the first layer of film is capable of allowing about one percent or less visible light transmission.

6. The electro-optic window of claim 1, wherein the perimeter portion of the first layer of film comprises one of ethylene-vinyl acetate, polyvinyl butyral, ceramic ink, and chrome.

7. The electro-optic window of claim 1, further comprising a second layer of film between at least a portion of the third and fourth substrates; wherein the second layer of film comprises a perimeter portion and a central portion; wherein the perimeter portion of the second layer of film extends around at least a portion of the electro-optic window; and wherein the perimeter portion of the second layer of film is coextensive with at least a portion of the sealing member.

8. The electro-optic window of claim 7, wherein the perimeter portion of the second layer of film is a UV-blocking layer; and
   wherein the perimeter portion of the second layer of film is capable of blocking at least about 99 percent of light having wavelengths between 280 and 400 nm.

9. The electro-optic window of claim 7, wherein the perimeter portion of the second layer of film is a UV-absorbing layer.

10. The electro-optic window of claim 7, wherein the perimeter portion of the second layer of film is one of opaque and nearly opaque; and
    wherein the perimeter portion of the second layer of film is capable of allowing about one percent or less visible light transmission.

11. The electro-optic window of claim 7, wherein the perimeter portion of the second layer of film extends around a perimeter of the window; and
    wherein the perimeter portion of the second layer of film is at least coextensive with the sealing member.

12. An electro-optic window comprising:
    a first substrate;
    an electro-optic element generally parallel to the first substrate, comprising:
       a second substrate;
       a third substrate generally parallel to the second substrate;

a sealing member disposed along at least a portion of a perimeter of one of the second and third substrates and extending therebetween; and a cavity defined between the second and third substrates, wherein the sealing member defines the sidewalls of the cavity;

a first layer of film having a perimeter portion extending around at least a portion of a perimeter of the window and disposed between at least a portion of the first and the second substrates;

a fourth substrate generally parallel to the first substrate and disposed adjacent to the third substrate; and a second layer of film disposed between at least a portion of the third and the fourth substrates.

13. The electro-optic window of claim 12, wherein the perimeter portion of the first layer of film is configured to at least one of block and absorb ultraviolet radiation; and wherein the perimeter portion of the first layer of film is at least coextensive with the sealing member.

14. The electro-optic window of claim 12, wherein the first and the second layer of films comprise at least one of ethylene-vinyl acetate, polyvinyl butyral, ceramic ink, and chrome.

15. A vehicle comprising an electro-optic window comprising:

a first substrate;

an electro-optic element generally parallel to the first substrate, comprising:

a second substrate;

a third substrate generally parallel to the second substrate;

a sealing member disposed along at least a portion of a perimeter of one of the second and third substrates and extending therebetween; and a cavity defined between the second and third substrates, wherein the sealing member defines the sidewalls of the cavity;

a fourth substrate generally parallel to the third substrate; and a first layer of film disposed between at least a portion of the first and second substrates, the first layer of film having a perimeter portion and a central portion;

wherein the perimeter portion of the first layer of film is coextensive with at least a portion of the sealing member.

16. The vehicle of claim 15, wherein the electro-optic window is a sunroof of the vehicle.

17. The vehicle of claim 15, wherein the perimeter portion of the first layer of film comprises one of a UV-absorbing layer and a UV-blocking layer;

wherein the perimeter portion of the first layer of film is opaque or nearly opaque; and wherein the perimeter portion of the first layer of film is capable of allowing about one percent or less visible light transmission.

18. The vehicle of claim 17, wherein the perimeter portion of the first layer of film is configured to block about at least 99 percent of light having wavelengths between 280 and 400 nm.

19. The vehicle of claim 15, further comprising a second layer of film disposed between the third substrate and the fourth substrate.

* * * * *